United States Patent [19]

Koyama et al.

[11] Patent Number: 5,782,140

[45] Date of Patent: Jul. 21, 1998

[54] STEERING WHEEL CORE METAL UNIT

[75] Inventors: Tooru Koyama, Aichi-ken; Kenji Mori, Gifu, both of Japan

[73] Assignee: Toyoda Gosei Co., Ltd., Nishikasugai-gun, Japan

[21] Appl. No.: 617,604

[22] Filed: Mar. 19, 1996

[30] Foreign Application Priority Data

Mar. 29, 1995 [JP] Japan .................... 7-072044

[51] Int. Cl.⁶ .................................................. B62D 1/04
[52] U.S. Cl. .................................................. 74/552
[58] Field of Search ................ 74/552, 558; 29/894.1

[56] References Cited

U.S. PATENT DOCUMENTS

| | | | |
|---|---|---|---|
| 2,552,083 | 5/1951 | Bartsch | 74/552 |
| 3,714,844 | 2/1973 | Tsuda | 74/552 |
| 4,386,538 | 6/1983 | Van Wicklin, Jr. | 74/552 |
| 4,875,387 | 10/1989 | Henigue | 74/552 |
| 5,204,043 | 4/1993 | Abiko et al. | |
| 5,356,178 | 10/1994 | Numata | 74/552 X |
| 5,445,048 | 8/1995 | Kaufer et al. | 74/552 |
| 5,544,545 | 8/1996 | Sanders et al. | 74/552 |
| 5,573,606 | 11/1996 | Evans et al. | 74/552 X |
| 5,603,783 | 2/1997 | Ferreira | |

FOREIGN PATENT DOCUMENTS

| | | | |
|---|---|---|---|
| 2129285 | 1/1973 | Germany | 74/552 |
| 178469 | 8/1987 | Japan | 74/552 |

*Primary Examiner*—Rodney H. Bonck
*Assistant Examiner*—Mary Ann Battista
*Attorney, Agent, or Firm*—Cushman Darby & Cushman IP Group of Pillsbury Madison & Sutro LLP

[57] ABSTRACT

A steering wheel core metal unit comprising a boss section, a boss/spoke connecting section, spoke sections and a ring section integrally die-cast, with the boss section serving as an insert. Before trimming and after being released from a die caster, the boss/spoke connecting section of the core metal unit is provided with a gate section and the ring section comprises a pair of inside and outside ribs. Overflow sections are provided along the outer periphery of the ring section at substantially the intermediate positions among the spoke sections, respectively. The sectional area of the outside rib is made larger than that of the inside rib so that a final molten metal merging portion comes to lie at the outer periphery of the ring section. Accordingly, even when the molten metal moves in the cavity of the die caster as it entrains air, the air can escape from the overflow sections and no blowhole is formed in the core metal as a die cast product.

12 Claims, 4 Drawing Sheets

STEERING WHEEL CORE METAL UNIT

BACKGROUND OF THE INVENTION

1. Field of the Invention

The present invention relates to a steering sheet core metal unit comprising a boss as an insert to which a steering shaft is connected, a boss/spoke connecting section, spoke sections and a ring section, all of which are integrally die-cast.

2. Description of Related Art

Recently, from the standpoint of productivity and with the improvement in the performance of die casting metals such as aluminum, magnesium and etc., a steering wheel core metal unit (hereinafter referred to as the "wheel core metal unit") comprising a boss section 11, a boss/spoke connecting section 13, spoke sections 15 and 16 and a ring section 17 (see FIGS. 1 and 2) which, with the exclusion of the boss section 11, are integrally die-cast, has been sold in the market.

The above-mentioned wheel core metal unit is manufactured by die-casting so as to have a gate section 19 at the boss/spoke connecting section 13, a plurality of overflow sections 21 and 23 on the outer periphery of the ring section 17 at substantially the intermediate positions among the spoke sections 15 and 16, respectively.

The overflow sections 21 and 23 serve as escapes for excessive filling of molten metal and for entrained air.

That is, the reasons for the formation of these overflow sections are that when the material for the above-mentioned wheel core metal unit is die-cast, a somewhat excessive amount of molten metal is filled into the cavity of the die-caster so as to prevent the generation of a defective filling state and further, as the molten metal injected into the cavity of the die-caster at a pressure higher than one barometric pressure, the molten metal moves in the cavity as it entrains air. When this entrained air remains in the cavity, blowholes are formed in the resultant die-cast product.

Further, from the point of view of strength, the ring section 17 has been formed such that it is channel-shaped (or U-shaped), H-shaped or cross-shaped in cross-section with the provision of a pair of ribs 25 and 27 inside and outside thereof, respectively.

Accordingly, when a molten metal has flowed into the ring section from the spoke sections, there is a tendency that the molten metal first fills the outside rib 27 of the above-mentioned rib pair for the following reasons.

That is, the die-cast metal used for forming a core metal has a comparatively level latent heat of melting (88–95 kcal) and solidifies easily so that it is injected at a high speed to fill the ring section prior to its solidification. As a result, when the die casting metal flows into the ring section from the gate section through the spoke sections 15 or 16, it does not gradually flow toward the inside rib 25 of the ring section but enters the spoke sections after it runs against the wall of the die caster outside the ring section so that it tends to flow first into the outside rib 27.

Thus, the above-described conventional die cast wheel core metal unit has had the disadvantage that the final molten metal merging portion comes to lie inside the ring section and the overflow section cannot function sufficiently. This tendency increases especially when the ring section is channel-shaped (or U-shaped) or H-shaped making substantially an intermediate draw cross-section.

SUMMARY OF THE INVENTION

The present invention has been made in view of the above-described disadvantage of the conventional die-cast wheel core metal unit and an object of the present invention is to provide a die-cast wheel core metal unit which is provided with a ring section having a pair of inside and outside ribs and which is characterized in that at the time of die casting, a molten metal merging portion comes to lie at the outer peripheral portion of the ring section without fail so that the overflow sections can function sufficiently.

The wheel core metal unit according to the present invention comprises a boss section as an insert to which a steering shaft is connected, a boss/spoke connecting section, spoke sections and a ring section which are integrally die-cast, with the ring section comprising a pair of inside and outside ribs. Further, in the state in which the core metal is ready for trimming, after it is released from the die caster, the core metal has a gate section at the boss/spoke connecting section and overflow sections along the outer periphery of the ring section at substantially the intermediate positions among the spoke sections, respectively. Moreover, the sectional area of the outside rib of the rib pair is made larger than that of the inside rib so that a final molten metal merging portion comes to lie at an outer peripheral portion of the ring section.

Thus, with the above structure, even when the molten metal moves in the cavity of the die caster as it entrains air, such entrained air is allowed to escape at the overflow sections without fail so that no blowhole is formed in the die-cast wheel core metal as a product.

DETAILED DESCRIPTION OF THE INVENTION

Figure 1:
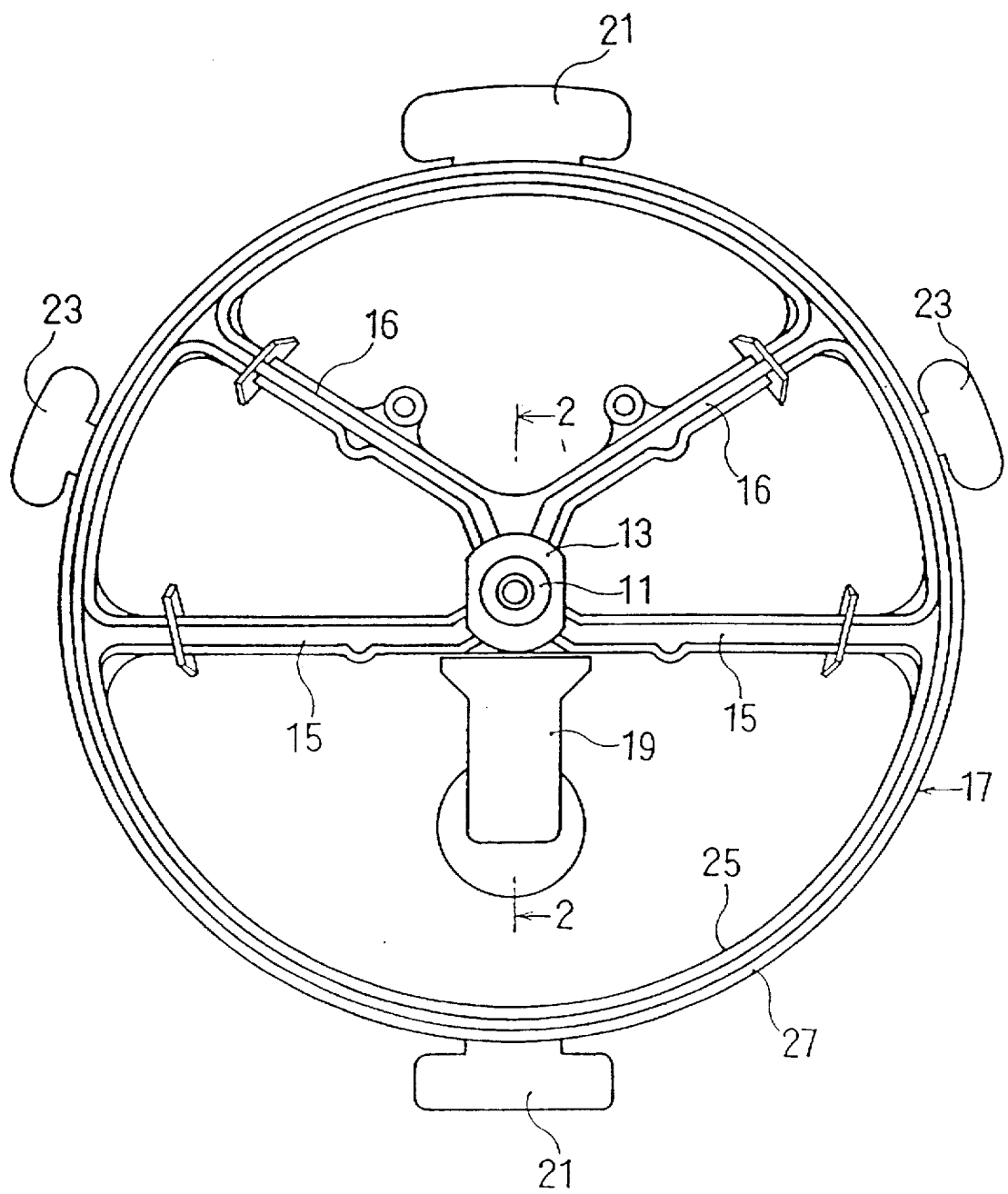
FIG. 1 is a plan view of a wheel core metal unit according to the present invention shown after it is released from a die caster.

Preferred embodiments of the present invention will now be described by referring to the accompanying drawings wherein like parts are designated by like reference numerals and no redundant description of these like parts is given. Further, the present invention will be described mainly with reference to FIG. 3 wherein the ring forming part of the wheel core metal unit of the invention is channel-shaped in section but the description will apply to a case where the ring section has any of the above-mentioned other sectional configurations.

Figure 2:
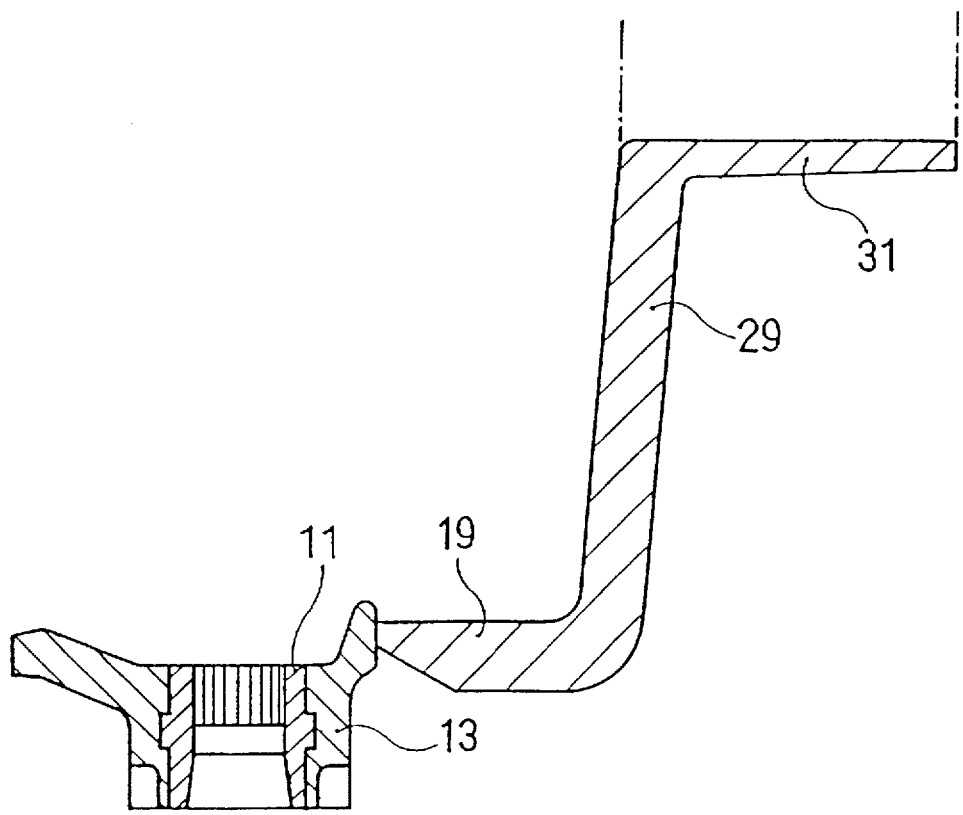
FIG. 2 is a sectional view taken along the 2—2 line of FIG. 1.

(1) As shown in FIGS. 1 and 2, the wheel core metal unit according to the present invention basically comprises a boss section 11 as an insert to which a steering shaft (not shown) is connected, a boss/spoke connecting section 13, spoke sections 15 and 16 and a ring section 17 which are integrally die-cast, with the ring section 17 being provided with a pair of inside and outside ribs 25 and 27, respectively.

This die cast product has a gate section 19 at the boss/spoke connecting section 13 and overflow sections 21 and 23 along the outer periphery of the ring section at substantially the intermediate positions among the spoke sections, respectively, after it is released from the die caster and before it is trimmed. Note that in FIG. 2, reference number 29 designates a gate section and reference numeral 31 designates a socket.

(2) In the illustrated embodiment, the sectional area of the outside rib 27 of the rib pair is made larger than that of the inside rib 25 so that the final molten metal merging portion comes to lie at the outer peripheral portion of the ring section 17. Usually, the sectional area of the outside rib 27 is made larger by 10–30% (desirably by 15–25%) than that of the inside rib 25. If less than 10 %, the effect of the present invention (i.e., causing the molten metal merging portion to lie at the outside rib) cannot be expected while if more than 30%, the difference in thickness between the outside rib 27 and the inside rib 25 increases resulting in the danger of generation of a shrinkage crack.

Figure 3:
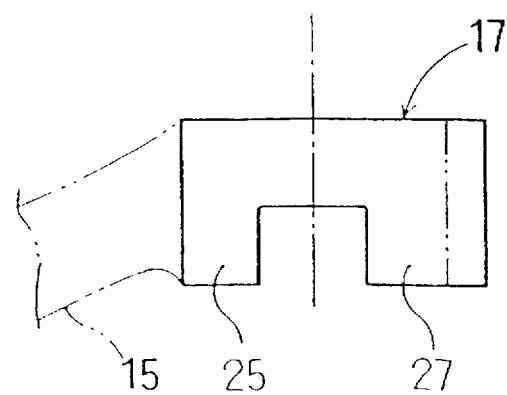
FIG. 3 is a sectional view of one example of a ring forming part of the steering wheel core metal unit shown in FIG. 1.
Figure 4:
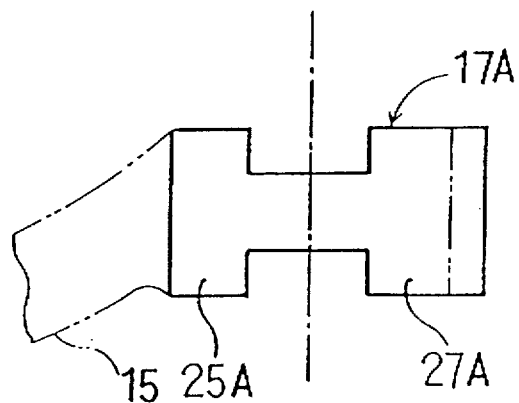
FIG. 4 is a sectional view of another example of a ring section which forms part of the wheel core metal unit shown in FIG. 1.
Figure 5:
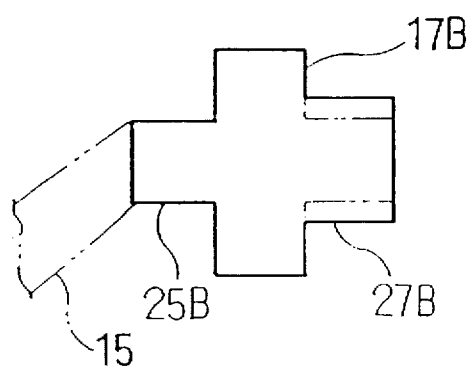
FIG. 5 is a sectional view of a further example of a ring section which forms part of the wheel core metal unit shown in FIG. 1.

As shown in FIGS. 3 and 4, where the ring section 17 (17A) is channel-shaped (or U-shaped) or H-shaped in section, the thickness of the outside rib 27 (27A) is made larger toward outside. Further, as shown in FIG. 5, where the ring section 17B is cross-shaped in section, the thickness of the outside rib 27B is enlarged in the vertical direction. Note that each of the two-dot chain lines in FIGS. 3 through 5 designates the shape of the outside rib before enlargement.

Next, a case where the wheel core metal unit according to the instant embodiment is diecast will be described.

A molten metal flows into the ring section 17 from the gate section 19 through the boss-spoke connecting section 13 and the spoke sections 15. In this case, since the sectional area of the outside rib 27 of the ring section 17 is larger than that of the inside rib 25, the molten metal flows in such a manner that it is completely filled into the inside rib 25 and then flows into the outside rib 27. That is, the molten metal merging portion comes to lie at the outer peripheral portion of the ring section 17.

Accordingly, when the wheel core metal unit is die-cast, the final molten metal merging portion comes to lie at the outer peripheral portion of the ring section without fail and excess molten metal and/or entrained air can enter the overflow sections.

Figure 6:
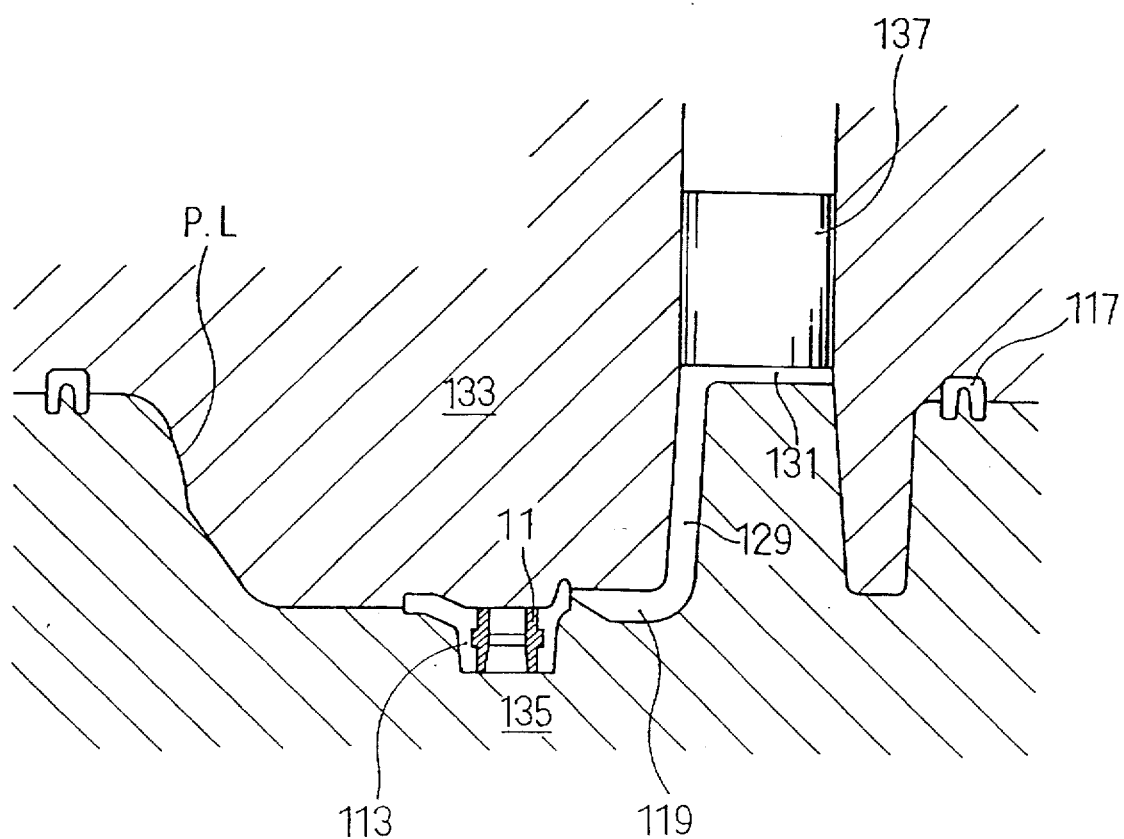
FIG. 6 is a cross-sectional view of a portion of a mold for die-casting the wheel core metal unit.

Although the manner of how the wheel core metal unit is manufactured has been described on the basis of a finished product for the sake of convenience, one example of a die caster (mold) for die-casting a wheel core metal unit having a channel-shaped ring section is shown in FIG. 6 for reference.

The die caster comprises an upper die 133 and a lower die 135 and includes a boss/spoke connecting forming part section 113 at substantially the center of the die caster, a ring section forming part 117 formed via a spoke forming part (not shown), a pouring gate 119, a gate 129 and a socket 131 which latter three parts are formed along the die-matching plane PL. Further, an injection piston 137 is mounted in the socket 131.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A steering wheel core metal unit comprising a boss portion, a connecting section, a plurality of spoke sections connected to said connecting section and a ring section connected to said plurality of spoke sections, wherein:

(a) said connecting section, said plurality of spoke sections and said ring section are integrally formed by die-casting molten metal, with said boss portion serving as an insert;

(b) said connecting section includes a gate section after said core metal unit is released from a caster and before trimming;

(c) said ring section is provided with a plurality of overflow sections along an outer periphery thereof, disposed substantially at intermediate positions among said plurality of spoke sections, respectively; and (d) said ring section comprises interconnected inside and outside ribs with a cross-sectional area of said outside rib being larger than that of said inside rib, whereby a final molten metal merging portion comes to lie at an outer peripheral portion of said ring section enabling entrained air and any excess molten metal to enter the overflow sections.

2. A steering wheel core metal unit according to claim 1, wherein the cross-sectional area of said outside rib is made 10–30% larger than that of said inside rib.

3. A steering wheel core metal unit according to claim 1, wherein the cross-sectional area of said outside rib is made 15–25% larger than that of said inside rib.

4. A steering wheel core metal unit according to claim 1, wherein said ring section is channel-shaped in section.

5. A steering wheel core metal unit according to claim 1, wherein said ring section is H-shaped in section.

6. A steering wheel core metal unit according to claim 1, wherein said ring section is cross-shaped in section.

7. A steering wheel core metal unit comprising:

a boss portion, a connecting section, a plurality of spoke sections connected to said connecting section, and a ring section connected to said plurality of spoke sections, said connecting section, said plurality of spoke sections and said ring section being integrally formed by die-casting molten metal, with said boss portion serving as an insert, said ring section comprising an inside rib, an outside rib and a cross-sectional area of said outside rib being larger than that of said inside rib so that during die-casting, entrained air and molten metal may move toward an outer periphery of said ring section.

8. A steering wheel core metal unit according to claim 7, wherein the cross-sectional area of said outside rib is made 10–30% larger than that of said inside rib.

9. A steering wheel core metal unit according to claim 7, wherein the cross-sectional area of said outside rib is made 15–25% larger than that of said inside rib.

10. A steering wheel core metal unit according to claim 7, wherein said ring section is channel-shaped in section.

11. A steering wheel core metal unit according to claim 7, wherein said ring section is H-shaped in section.

12. A steering wheel core metal unit according to claim 7, wherein said ring section is cross-shaped in section.

* * * * *